(12) United States Patent
Amano

(10) Patent No.: US 7,751,289 B2
(45) Date of Patent: Jul. 6, 2010

(54) OPTICAL DISC APPARATUS AND INFORMATION RECORDING METHOD THEREBY

(75) Inventor: Masaki Amano, Yachiyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 485 days.

(21) Appl. No.: 11/891,457

(22) Filed: Aug. 10, 2007

(65) Prior Publication Data
US 2008/0144468 A1 Jun. 19, 2008

(30) Foreign Application Priority Data
Dec. 14, 2006 (JP) ............... 2006-337142

(51) Int. Cl.
*G11B 15/52* (2006.01)
(52) U.S. Cl. .............. 369/47.53; 369/47.44; 369/53.13; 369/53.27
(58) Field of Classification Search ........................ None
See application file for complete search history.

(56) References Cited

U.S. PATENT DOCUMENTS

| | | | | |
|---|---|---|---|---|
| 2002/0131350 | A1* | 9/2002 | Kurobe et al. ............... | 369/47.4 |
| 2002/0136121 | A1* | 9/2002 | Salmonsen et al. ........ | 369/47.53 |
| 2003/0067852 | A1* | 4/2003 | Tsukihashi et al. ........ | 369/44.38 |
| 2004/0136303 | A1 | 7/2004 | Watanabe et al. | |
| 2005/0099912 | A1* | 5/2005 | Chuang et al. ............ | 369/47.38 |
| 2005/0243675 | A1* | 11/2005 | Masaki et al. ............. | 369/53.28 |
| 2006/0193223 | A1 | 8/2006 | Jung et al. | |
| 2007/0121451 | A1* | 5/2007 | Nishimura et al. ........ | 369/47.53 |

FOREIGN PATENT DOCUMENTS

| | | |
|---|---|---|
| CN | 1516128 A | 7/2003 |
| CN | 1822128 A | 8/2006 |
| JP | 2005-222676 | 8/2005 |
| JP | 2006-114166 | 4/2006 |
| JP | 2007-080404 | 3/2007 |

OTHER PUBLICATIONS

China State Intellectual Property Office (SIPO) office action for SIPO patent application 200710149115.7 (Jan. 8, 2010).

* cited by examiner

*Primary Examiner*—Paul Huber
(74) *Attorney, Agent, or Firm*—Townsend and Townsend and Crew LLP (57) ABSTRACT

If a failure is detected during operation of information recording in an optical disc apparatus, the optical disc apparatus stops the recording operation, changes the number of rotations of the optical disc to a low-speed value, seeks a selected recording region, performs OPC processing and trial write operation, measures a β value as a result of the trial write operation, calculates optimal recording power based on the difference between the measured β value and a target β value and recording power set in the OPC processing, and starts the operation of information recording with the selected number of rotations for low-speed operation by use of the optimal recording power.

9 Claims, 4 Drawing Sheets

OPTICAL DISC APPARATUS AND INFORMATION RECORDING METHOD THEREBY

CLAIM OF PRIORITY

The present application claims priority from Japanese application serial No. P2006-337142, filed on Dec. 14, 2006, the content of which is hereby incorporated by reference into this application.

BACKGROUND OF THE INVENTION

1. Technical Field of the Invention

The present invention relates to an optical disc apparatus, specially relates to control of recording power when information recording is performed.

2. Description of the Related Art

As to an optical disc apparatus, an increase in the laser output is demanded with increasing recording speed, resulting in a reduced output margin. This makes it more difficult to stabilize the output in a high-temperature environment. Conventionally, a technology of suppressing the influence of the variation in the laser output to the control current of a laser diode has been implemented to obtain a stable recording quality; and new technologies are also under consideration. With high-speed recording of DVD, for example, so-called running OPC (Optimum Power Control) and walking OPC are implemented in order to control the laser output at the time of recording. In running OPC, the intensity of returned light (reflected laser beams) of laser beams applied to an optical disc for information recording is detected and the laser output is corrected based on the detection result. In walking OPC, recording operation is periodically stopped, the recording quality of the signal recorded immediately before the stop of operation is measured, and the laser output is corrected based on the measurement result.

Technologies of ensuring the recording quality are described, for example, in JP-A-2005-222676 and JP-A-2006-114166. In order to perform stable recording to an optical disc with an excellent recording quality, JP-A-2005-222676 describes a technology of performing OPC (Optimum Power Control) again based on the elapsed time since last OPC or temperature information if recording at a zone changeover position with the ZCLV (Zone Constant Linear Velocity) method is suspended. JP-A-2006-114166 describes a technology of recording information with the PCAV (Partial Constant Angular Velocity) method in an optical disc apparatus, the technology comprising the steps of: first performing trial write operation to an inner circumference of an optical disc; moving an optical pickup toward the outer circumference of the disc; if a maximum amplitude of a focus error signal and a tracking error signal reaches or exceeds a threshold value, decelerating a maximum recording speed so that the maximum amplitude become less than the threshold value and setting an information recording speed; and setting recording power for information recording based on the power information obtained in the above-mentioned trial write operation, wherein trial write operation is performed on the outer circumference of the optical disc only in the case of 16× speed recording in which decelerated recording is not required.

SUMMARY OF THE INVENTION

In running OPC of the above-mentioned conventional technologies, when an optical disc is rotating at high speed, the detection accuracy of returned light decreases resulting in a decrease in the recording quality controlled. In walking OPC, the recording operation is periodically stopped resulting in a prolonged recording time. In addition, if the optical disc has a local record sensitivity variation, a problem that it is difficult to cope with such variation arises. Furthermore, if a failure occurs during recording making it difficult to maintain high-speed operation in the optical disc apparatus, it is necessary to continue recording with decelerated operation speed. However, in these conventional technologies of correcting the laser output, selection of proper recording power after deceleration is difficult. Furthermore, with the above-mentioned technology described in JP-A-2005-222676, correction of recording is limited to the zone changeover position and therefore recording conditions will differ largely at a disc position where there is a large temperature rise. With the above-mentioned technology described in JP-A-2006-114166, the optimal recording power obtained at the time of disc loading is used and therefore recording conditions will differ largely at a disc position where there is a large temperature rise.

Taking into consideration the situation of the above-mentioned conventional technologies, a subject of the present invention is to ensure stable proper recording quality in the optical disc apparatus even under high-temperature environmental conditions. In particular, another subject of the present invention is to securely set proper recording power after deceleration even if a failure occurs during recording making it necessary to continue recording with decelerated high-speed operation.

It is an object of the present invention to solve the above-mentioned subjects and provide an optical disc apparatus which ensures recording performance and reliability.

The present invention is a technology which can solve the above-mentioned subjects to accomplish the above-mentioned object.

Specifically, if a failure is detected during operation of information recording with the optical disc apparatus, the present invention comprises the steps of: stopping the recording operation; changing the number of rotations of the optical disc to a low-speed value; seeking a selected recording region, and performing OPC processing and trial write operation; measuring a β value of a result of the trial write operation; calculating optimal recording power based on the difference between the measured β value and the target β value and on the recording power set in the above-mentioned OPC processing; and starting the operation of information recording with the number of rotations for low-speed operation by use of the optimal recording power.

DETAILED DESCRIPTION OF THE PREFERRED EMBODIMENT

An embodiment of the present invention will be explained below with reference to the accompanying drawings.

Figure 1:
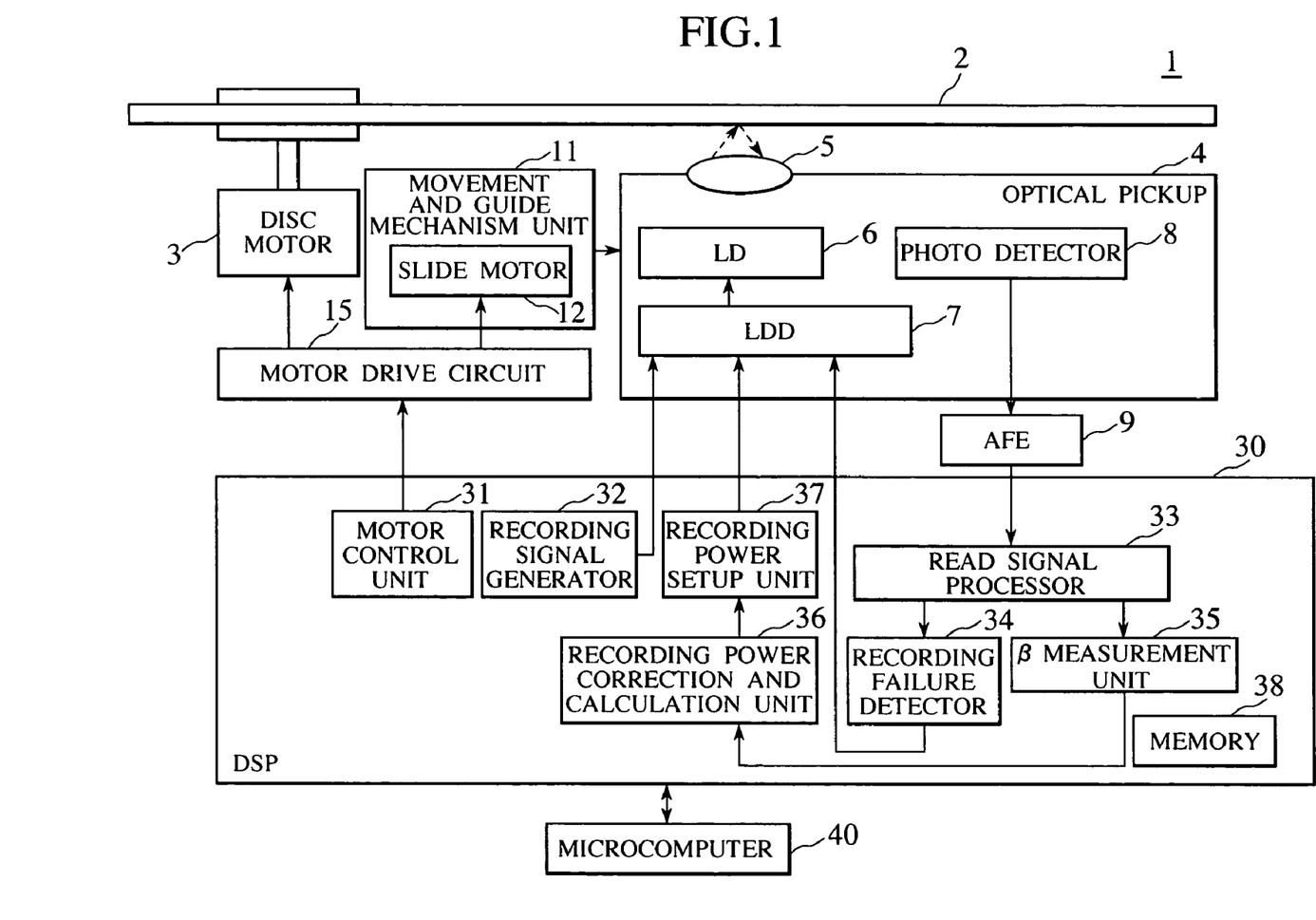
FIG. 1 is an example configuration diagram showing an optical disc apparatus as an embodiment of the present invention.
Figure 2:
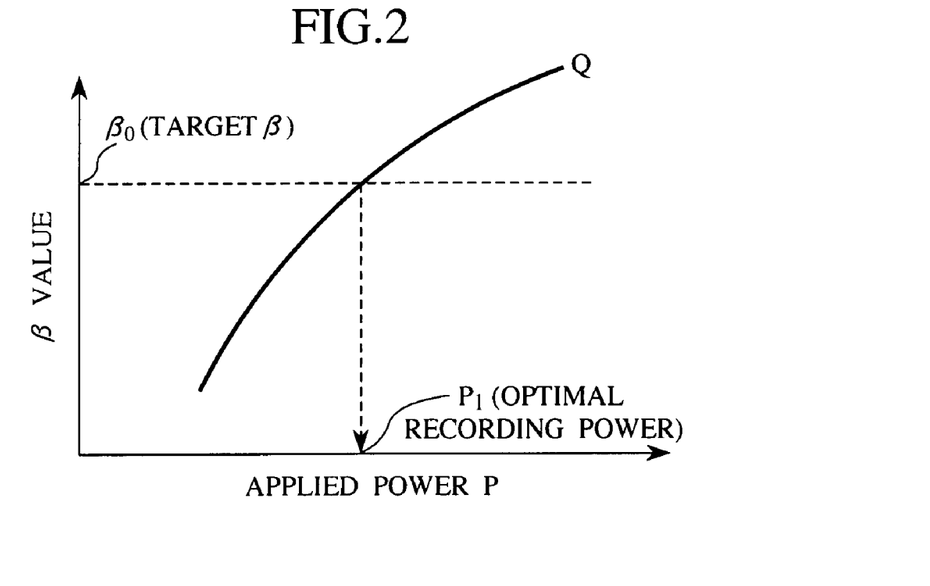
FIG. 2 is a diagram showing an optimal recording power setting for trial write operation by OPC processing after detection of a recording condition failure in the optical disc apparatus of FIG. 1.
Figure 3:
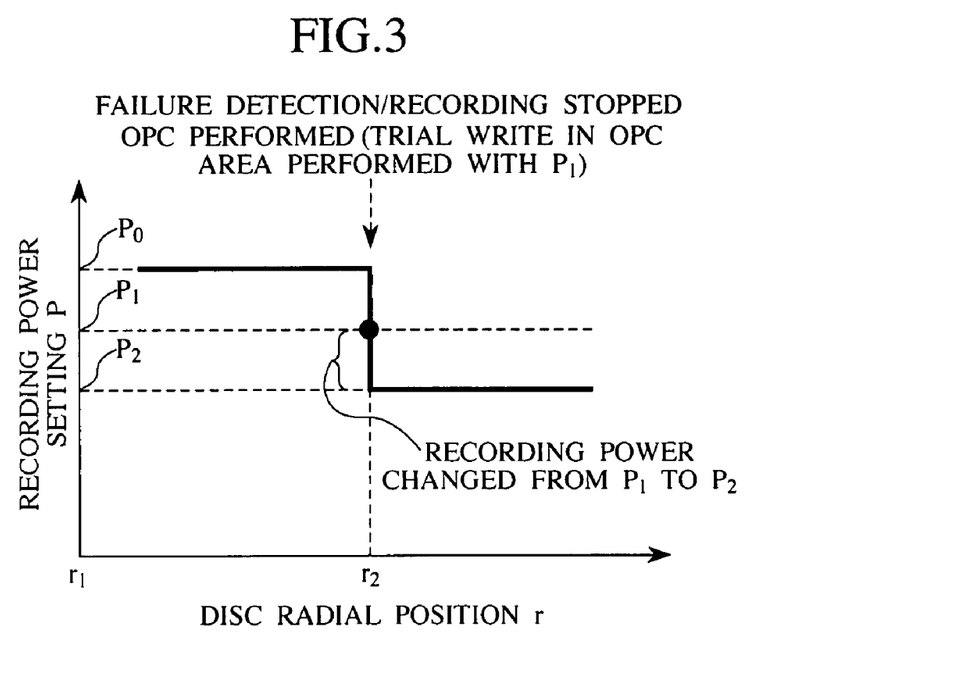
FIG. 3 is a diagram showing variations of a detecting position of a recording condition failure and a recording power setting in the optical disc apparatus of FIG. 1.
Figure 4:
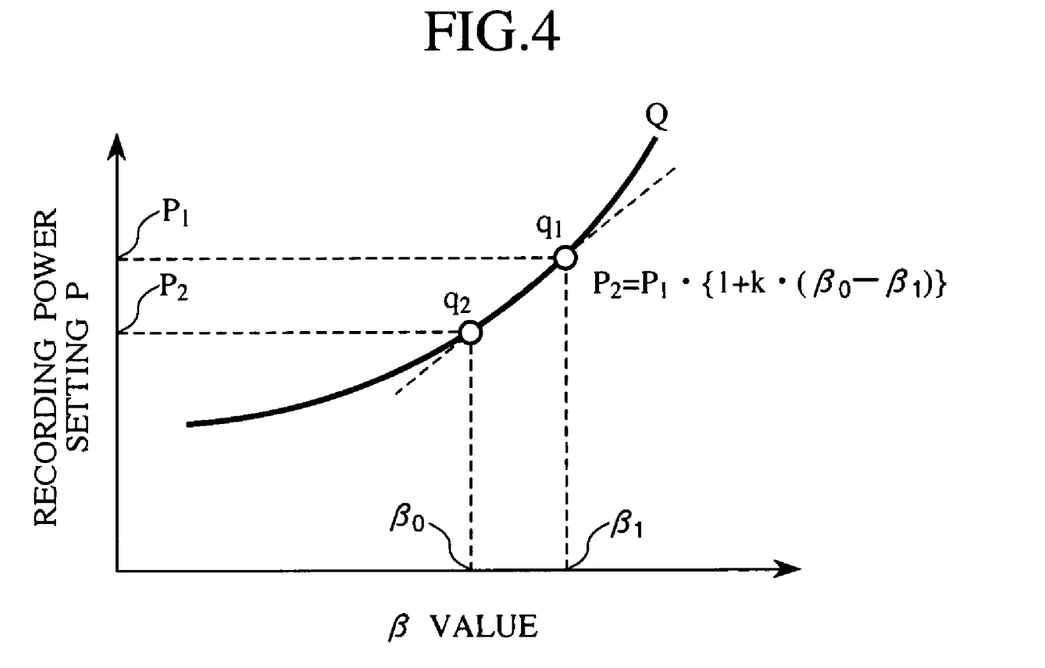
FIG. 4 is a diagram showing an optimal recording power setting for decelerated recording based on trial write operation after detection of a recording condition failure in the optical disc apparatus of FIG. 1.
Figure 5:
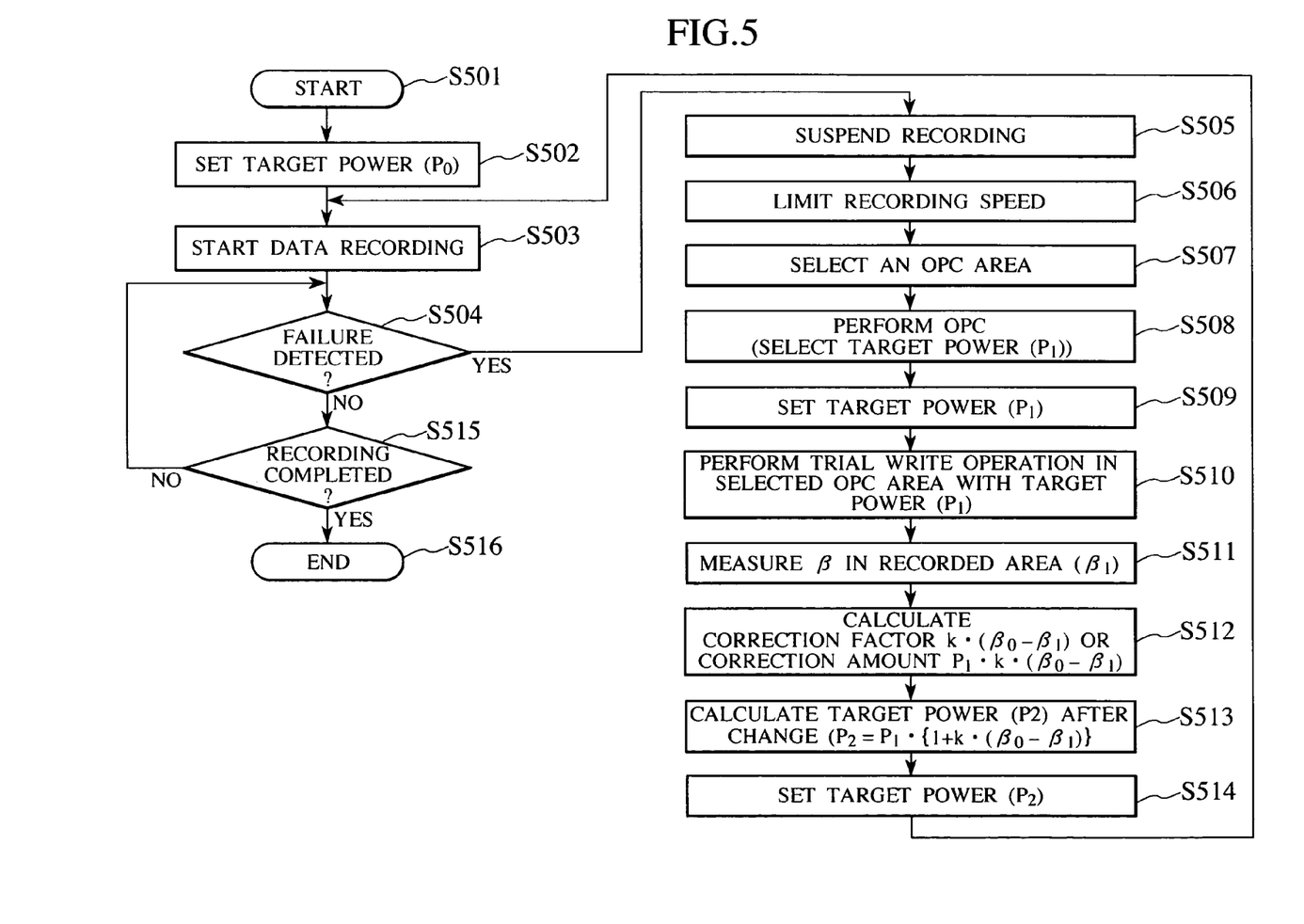
FIG. 5 is a flow chart showing the operation flow of information recording in the optical disc apparatus of FIG. 1.

FIG. 1 to FIG. 5 are diagrams showing an embodiment of the present invention. FIG. 1 is an example configuration diagram showing an optical disc apparatus as an embodiment of the present invention. FIG. 2 is a diagram showing an optimal recording power setting for trial write operation by OPC processing after detection of a recording condition failure in the optical disc apparatus of FIG. 1. FIG. 3 is a diagram showing variations of a detecting position of a recording condition failure and a recording power setting in the optical disc apparatus of FIG. 1. FIG. 4 is a diagram showing an optimal recording power setting for decelerated recording based on trial write operation after detection of a recording condition failure in the optical disc apparatus of FIG. 1. FIG. 5 is a flow chart showing the operation flow of information recording in the optical disc apparatus of FIG. 1.

Referring to FIG. 1, the optical disc apparatus 1, as an embodiment of the present invention, includes an optical discs 2, a disc motor 3, an optical pickup 4, an objective lens 5, a laser diode 6, a laser drive circuit 7, and a photo detector 8. The optical discs 2 are such as DVD, blue laser disc, etc. The disc motor 3 drives the rotation of the optical disc 2. The laser diode 6 generates laser beams having a predetermined strength or quantity of light for read/write operation. The laser drive circuit 7 drives the laser diode 6. The photo detector 8 receives reflected laser beams from a recording surface (hereafter referred to as disc surface) of the optical disc 2 through the objective lens 5, converts the light to an electrical signal, and outputs the signal. Furthermore, the optical disc apparatus 1 includes an analog front end 9, a movement and guide mechanism unit 11, a slide motor 12, and a motor drive circuit 15. The analog front end 9 amplifies a signal from the photo detector 8 and performs other pieces of analog processing. The movement and guide mechanism unit 11, consisting of a linear guide member (not shown), a lead screw member (not shown), etc., moves the optical pickup 4 approximately in the radial direction of the optical disc 2. The slide motor 12, included in the movement and guide mechanism unit 11, drives the rotation of the lead screw member (not shown). The motor drive circuit 15 drives the disc motor 3, the slide motor 12, etc. Furthermore, the optical disc apparatus 1 includes a DSP (Digital Signal Processor) 30, a motor control unit 31, a recording signal generator 32, a read signal processor 33, a recording failure detector 34, a β measurement unit 35, a recording power correction and calculation unit 36, a recording power setup unit 37, a memory 38, and a microcomputer 40. The motor control unit 31, included in the DSP 30, controls the motor drive circuit 15. The recording signal generator 32 generates a recording signal. The read signal processor 33, included in the DSP 30, processes a read signal from the photo detector 8 as an RF signal, a tracking error signal, or a focus error signal. The recording failure detector 34, included in the DSP 30, detects a failure of information recording condition by means of the read signal outputted from the read signal processor 33. The β measurement unit 35, included in the DSP 30, measures a β value of a recording mark recorded on the optical disc 2 by means of the read signal from the read signal processor 33. The recording power correction and calculation unit 36 obtains the difference between a preset target β value and the β value measured by the above-mentioned β measurement unit 35, and calculates a correction factor or correction amount of recording power and optimal recording power according to the difference between the two β values. The memory 37 is included in the DSP 30. The microcomputer 40 is a control circuit which controls the DSP 30.

The β measurement unit 35 measures a level of a recording quality evaluated by jitter or error rate as a β value.

Each of the motor control unit 31, the recording signal generator 32, the read signal processor 33, the recording failure detector 34, the β measurement unit 35, the recording power correction and calculation unit 36, and the recording power setup unit 37 is formed as an electronic circuit in the DSP 30.

The microcomputer 40, as a control circuit, controls at least one of the motor control unit 31, the recording signal generator 32, the β measurement unit 35, the recording failure detector 34, the recording power correction and calculation unit 36, and the recording power setup unit 37 in the DSP 30. The microcomputer 40 controls the DSP, under a condition before the optical disc apparatus 1 starts recording operation, to make the optical disc apparatus 1 perform normal OPC processing, set a target β value, and set optimal recording power of laser beams applied to the recording surface of the optical disc 2 corresponding to the target β value. (The optimal recording power is recording power within an optimal range, i.e., a range which is sufficient for effectively constituting the present invention. Hereafter, the optimal recording power means this technical information.) If the recording failure detector 34 detects a failure of information recording condition during subsequent recording operation of the optical disc apparatus, the microcomputer 40 controls the recording failure detector 34 to output the control signal to the laser drive circuit 7 to stop the output of a drive signal for recording from the laser drive circuit 7 to the laser diode 6, and at the same time controls the recording signal generator 32 to stop the generation and output of the recording signal to suspend the recording operation. Furthermore, the microcomputer 40 controls the motor control unit 31 to change the number of rotations of the optical disc 2 to a low-speed value through the motor drive circuit 15, and controls the recording signal generator 32 with the selected number of rotations for low-speed operation to perform OPC processing and trial write operation to a selected recording region. In the OPC processing, optimal recording power for trial write operation is obtained. The trial write operation is performed with the obtained optimal recording power. Then, the microcomputer 40 directs the β measurement unit to measure the β value of the recording mark written as a trial, and controls the recording power correction and calculation unit 36 to compare the measured β value with the target β value, calculate a correction factor or correction amount of recording power according to the difference between the two β values, correct the above-mentioned optimal recording power for trial write operation based on the calculated correction factor or correction amount of recording power, and calculate optimal recording power for recording. Furthermore, the microcomputer 40 controls the recording power setup unit 37 to set the above-mentioned optimal recording power for recording. Then, the microcomputer 40 directs the optical disc apparatus 1 to start the operation of information recording with the number of rotations for low-speed operation by use of the set optimal recording power. When the microcomputer 40 directs the recording power correction and calculation unit 36 to calculate the correction amount or factor of recording power, the microcomputer 40 directs the optical disc apparatus 1 to read the above-mentioned target β value read from the memory 38.

As a failure of the above-mentioned information recording condition, the above-mentioned recording failure detector 34 detects at least one of the facts that the quantity of light or intensity of returned light of laser currently being recorded has reached a permissible limit, that the amount of tracking fluctuation or focus fluctuation has reached a permissible limit, that the fluctuation of the β value in walking OPC has exceeded a permissible limit and correction of recording power has become impossible, that the variation of recording current has reached a permissible limit, and that transmission of information data from an external host computer (not shown) has stopped or the amount of transmission of the information data has decreased, and accordingly the amount of information data on the optical disc apparatus has become a permissible limit or less.

Furthermore, as the above-mentioned recording region (hereafter referred to as OPC area) in which the above-mentioned OPC processing and trial write operation are performed under the above-mentioned selected number of rotations for low-speed operation, the microcomputer 40, as a control circuit, selects a recording region in which the recording-speed value under the low-speed rotating condition is equal to or slightly smaller than that in trial write operation on the inner or outer circumference of the disc performed before the start of recording. The OPC area may be either an area on the inner circumference or an area on the outer circumference of the disc.

In the following explanations, components of the optical disc apparatus quoted from FIG. 1 are assigned the same reference numerals as those in FIG. 1.

FIG. 2 is a diagram showing an optimal recording power setting in OPC processing performed in the OPC area, with the number of rotations of the optical disc 2 changed to a low-speed value (hereafter this condition is referred to as low-speed rotating condition), after detection of a recording condition failure in the optical disc apparatus 1. The set optimal recording power is used for trial write operation to be performed subsequently.

In FIG. 2, the horizontal axis is assigned the power (hereafter referred to as recording power) applied to the recording surface of the optical disc 2 in the OPC processing under the low-speed rotating condition of optical disc apparatus 1, and the vertical axis the β value of the recording mark on the recording surface of the optical disc 2. In OPC processing under the low-speed rotating condition of the optical disc 2, the recording surface of the optical disc 2 is irradiated with laser beams having varying recording power from the laser diode 6, and the β measurement unit 35 measures the β value of the recording mark corresponding to each recording power by means of the read signal by reflected laser beams to obtain a characteristic curve Q. Then, the microcomputer 40 sets a target β value ($=\beta_0$) based on the recording quality, and sets optimal recording power $P_1$ for the laser beams corresponding to the target value ($\beta_0$) based on the characteristic curve Q. The optimal recording power $P_1$ refers to recording power in an optical range, i.e., a range which is sufficient for effectively constituting the present invention. The microcomputer 40 directs the optical disc apparatus 1 to perform trial write operation in the OPC area by use of the set optimal recording power $P_1$.

FIG. 3 is a diagram showing variations of a detecting position of a recording condition failure and a recording power setting in the optical disc apparatus of FIG. 1.

In FIG. 3, the horizontal axis is assigned the recording position on the optical disc 2, i.e., the disc radial position, and the vertical axis the recording power setting. Reference symbol $r_1$ denotes a disc radial position where the optical disc apparatus 1 starts recording operation; $r_2$, a disc radial position where a recording condition failure is detected during recording; $P_0$, the optimal recording power set by OPC processing before the start of recording; $P_1$, the optimal recording power set by OPC processing under the low-speed rotating condition in the OPC area after detection of a recording condition failure; $P_2$, the optimal recording power calculated based on the β value measured from the trial write operation, when trial write operation is performed with recording power $P_1$ in the OPC area under the low-speed rotating condition. If the recording failure detector 34 detects a recording condition failure at a disc radial position $r_2$ during information recording with optimal recording power $P_0$, the microcomputer 40 stops the output of the drive signal for recording from the laser drive circuit 7 to the laser diode 6 and at the same time stops the generation and output of the recording signal in the recording signal generator 32 to suspend the recording operation. Furthermore, in the condition of stopped recording operation, the microcomputer 40 controls the motor control unit 31 to change the number of rotations of the optical disc 2 to a low-speed value, and controls the recording signal generator 32 under the selected low-speed rotating condition to perform OPC processing and trial write operation in a selected OPC area. In the OPC processing, the optimal recording power $P_1$ for trial write operation is obtained. The trial write operation is performed with the obtained optimal recording power $P_1$. Then, the microcomputer 40 directs the β measurement unit 35 to measure the β value of the recording mark written as a trial, and controls the recording power correction and calculation unit 36 to compare the measured β value with a target β value, calculate a correction factor or correction amount of recording power according to the difference between the two β values, correct the optimal recording power $P_1$ for the above-mentioned trial write operation based on the calculated correction factor or correction amount of recording power, and calculate optimal recording power $P_2$ for recording. Furthermore, the microcomputer 40 controls the recording power setup unit 37 to set the above-mentioned optimal recording power for recording. Then, the microcomputer 40 directs the optical disc apparatus 1 to start the operation of information recording under the low-speed rotating condition from the disc radial position $r_2$ based on the set optimal recording power $P_2$. Specifically, if a recording condition failure is detected, the recording operation by the optimal recording power $P_0$ is stopped, the optimal recording power $P_1$ is obtained by OPC processing in the OPC area under the low-speed rotating condition, trial write operation is performed in the OPC area by use of the optimal recording power $P_1$, and the optimal recording power $P_1$ is changed to the optimal recording power $P_2$ based on the result of the trial write operation.

FIG. 4 is a diagram showing a setting of the above-mentioned optimal recording power $P_2$ for decelerated recording based on trial write operation with above-mentioned optimal recording power P1 in the OPC area after detection of a recording condition failure in the optical disc apparatus 1 of FIG. 1.

In FIG. 4, the horizontal axis is assigned the β value of the recording mark on the recording surface of the optical disc 2, and the vertical axis the recording power setting. $\beta_1$ is a β value measured from the recording mark written as a trial by use of the optimal recording power $P_1$. $\beta_0$ is a target β value preset based on the recording quality. The measurement value $\beta_1$ corresponds to the optimal recording power P1 at a point $q_1$ on the characteristic curve Q, and the target value $\beta_0$ to the optimal recording power $P_2$ at a point $q_2$ on the characteristic curve Q. When the characteristic curve Q between points $q_1$ and $q_2$ is approximated as a straight line, the inclination of the straight line is a conversion factor k between the β value and the recording power P, the conversion factor k being represented by the following Formula 1.

$$k=(P_1-P_2)/(\beta_1-\beta_0) \quad \text{(Formula 1)}$$

Therefore, the optimal recording power $P_2$ is represented by $$P_2=P_1 \cdot \{1+k \cdot (\beta_0-\beta_1)\} \quad \text{(Formula 2)}$$

The recording power correction and calculation unit 36 obtains a correction factor $k \cdot (\beta_0-\beta_1)$ or a correction amount $P_1 \cdot k \cdot (\beta_0-\beta_1)$ by calculating the conversion factor k from the characteristic curve Q, the target value $\beta_0$, and the measurement value $\beta_1$; corrects the optimal recording power $P_1$ used for trial write operation based on the obtained correction factor $k \cdot (\beta_0-\beta_1)$ or correction amount $P_1 \cdot k \cdot (\beta_0-\beta_1)$; and obtains the optimal recording power $P_2$ for recording. Specifically, in the recording power correction and calculation unit 36, the target value $\beta_0$ is compared with the measurement value $\beta_1$ to obtain a difference $(\beta_0-\beta_1)$ and then the optimal recording power $P_2$ is calculated. Then, the optimal recording power $P_2$ is set by the recording power setup unit 37 as optimal recording power for information recording under the low-speed rotating condition. After the optimal recording power $P_2$ has been set, the operation of information recording under the low-speed rotating condition is started from the disc radial position $r_2$ (the disc radial position where a recording failure is detected in FIG. 3) by use of the optimal recording power $P_2$.

FIG. 5 is a flow chart showing the operation flow of information recording in the optical disc apparatus 1 of FIG. 1.

Referring to FIG. 5, (1) The microcomputer 40 starts a recording mode of the optical disc apparatus 1 (Step S501).

(2) Prior to recording operation, the microcomputer 40 directs the optical disc apparatus 1 to perform OPC processing to obtain the optimal recording power $P_0$ (Step S502).

(3) The microcomputer 40 directs the optical disc apparatus 1 to start recording of information data based on a recording signal by use of the optimal recording power $P_0$ by the above-mentioned OPC processing (Step S503).

(4) The microcomputer 40 determines whether the recording failure detector 34 has detects a failure of information recording condition (Step S504).

(5) If a failure of information recording condition is detected as a result of the determination in Step S504, the microcomputer 40 directs the recording failure detector 34 to output a control signal to the laser drive circuit 7 to stop the output of the drive signal for recording from the laser drive circuit 7 to the laser diode 6, and at the same time stops the generation and output of the recording signal in the recording signal generator 32 to suspend (interrupt) the recording operation (Step S505).

(6) In the above-mentioned condition of stopped recording operation, the microcomputer 40 controls the motor control unit 31 to change the number of rotations of the optical disc 2 to a low-speed value through the motor drive circuit 15 to select the low-speed rotating condition (Step S506).

(7) The microcomputer 40 selects an area (OPC area) for performing OPC processing and trial write operation under the above-mentioned low-speed rotating condition (Step S507). As the OPC area, the microcomputer 40 selects a recording region in which the recording-speed value under the low-speed rotating condition is equal to or slightly smaller than that in trial write operation on the inner or outer circumference of the disc performed before the start of recording.

(8) The microcomputer 40 directs the optical disc apparatus 1 to perform OPC processing in the OPC area and, as shown in FIG. 2, selects target recording power (optimal recording power) $P_1$ based on the target β value ($\beta_0$) and the characteristic curve Q (Step S508).

(9) The microcomputer 40 directs the recording power setup unit 37 to set target recording power (optimal recording power) $P_1$ (Step S509).

(10) The microcomputer 40 directs the optical disc apparatus 1 to perform trial write operation in the OPC area by use of the optimal recording power $P_1$ (Step S510).

(11) The microcomputer 40 directs the β measurement unit to measure the β value of the recording mark written as a trial in the OPC area to obtain the measurement value $\beta_1$ (Step S511).

(12) The microcomputer 40 directs the recording power correction and calculation unit 36 to calculate a target value $\beta_0$ of the β value, a measurement value $\beta_1$ thereof, a characteristic curve Q (FIG. 4), a conversion factor k from the target value $\beta_0$ and the measurement value $\beta_1$; and further calculate a correction factor $k \cdot (\beta_0-\beta_1)$ or a correction amount $P_1 \cdot k \cdot (\beta_0-\beta_1)$ of recording power (Step S512).

(13) The microcomputer 40 directs the recording power correction and calculation unit 36 to correct the optimal recording power $P_1$ based on the correction factor or correction amount obtained in the above-mentioned Step S512 and calculate optimal recording power $P_2$ ($P_2=P_1 \cdot \{1+k \cdot (\beta_0-\beta_1)\}$) for recording (Step S513).

(14) The microcomputer 40 directs the recording power setup unit 37 to set the above-mentioned obtained optimal recording power $P_2$ for recording (Step S514).

(15) The microcomputer 40 returns control of recording operation to Step S503 and then directs the optical disc apparatus 1 to start recording of information data under the above-mentioned low-speed rotating condition.

(16) If the recording failure detector 34 has not detected a failure of information recording condition as a result of the determination in Step S504, the microcomputer 40 continues recording of information data and then determines whether recording of information data is completed or not or whether the recording should be terminated or not (Step S515).

(17) If recording of information data is completed or if the recording should be terminated as a result of the determination in the above-mentioned Step S515, the microcomputer 40 terminates recording operation (Step S516).

(18) If recording of information data is not completed or if the recording should not be terminated as a result of the determination in the above-mentioned Step S515, the microcomputer 40 directs the optical disc apparatus 1 to continue the recording operation.

The microcomputer 40 automatically executes a series of the above-mentioned steps (1) to (18) according to a program stored in a memory unit in the optical disc apparatus 1, such as a memory in the microcomputer 40, memory 38, etc.

In accordance with the embodiment explained with reference to FIG. 1 to FIG. 5, if a failure of information recording condition is detected during recording operation of the optical disc apparatus 1, the recording power is corrected based on OPC processing and trial write operation under the low-speed rotating condition, making it possible to certainly maintain a favorable recording quality.

Although the above-mentioned embodiment is configured so that the microcomputer 40, as a control circuit, controls the DSP 30, the present invention is not limited thereto. For example, it may be possible that the microcomputer and other control circuits be included in the DSP 30 or that some circuits in the DSP 30, such as the recording failure detector 34, the β measurement unit 35, the recording power correction and calculation unit 36, etc., be included in the microcomputer. Alternately, it may be possible that the DSP 30 is not used, for example, the recording failure detector 34, the β measurement unit 35, the recording power correction and calculation unit 36, etc. are formed as an independent circuit.

In accordance with the above-mentioned embodiment of the present invention, even if a failure occurs in the optical disc apparatus during recording, it is possible to ensure a favorable recording quality.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disc apparatus which irradiates a rotating optical disc with laser beams from an optical pickup, the apparatus comprising:
    a disc motor which drives the rotation of the optical disc;
    a movement and guide mechanism unit which moves the optical pickup approximately in the radial direction of the optical disc by means of a rotary driving force of the slide motor;
    a motor drive circuit which drives the disc motor and the slide motor;
    a motor control unit which forms a signal for controlling the motor drive circuit;
    a laser diode which emits the laser beams;
    a laser drive circuit which drives the laser diode;
    a recording signal generator which generates a recording signal to be supplied to the laser drive circuit;
    a recording failure detector which detects a failure of information recording condition by means of the read signal based on reflected laser beams from the optical disc;
    a β measurement unit which measures a β value of a recording mark recorded on the optical disc by means of the read signal based on reflected laser beams from the optical disc;
    a recording power correction and calculation unit which compares the measurement β value with a target β value, and calculates a correction factor or correction amount of recording power and optimal recording power according to the difference between the two β values;
    a recording power setup unit which sets the optimal recording power calculated; and
    a control circuit which controls the motor control unit, the recording signal generator, the β measurement unit, the recording failure detector, and the recording power correction and calculation unit; wherein
    the control circuit, if the recording failure detector detects a failure of information recording condition during operation of information recording, directs the laser drive circuit or the recording signal generator to stop recording operation, directs the motor control unit to change the number of rotations of the optical disc to a low-speed value based on the signal from the motor control unit, directs the optical disc apparatus to seek a selected recording region and perform OPC processing and trial write operation with the number of rotations for low-speed operation, directs the β measurement unit to measure a resultant β value of the trial write operation, directs the recording power correction and calculation unit to calculate optimal recording power based on the β value; and directs the optical disc apparatus to start the operation of information recording with the number of rotations for low-speed operation.

2. The optical disc apparatus according to claim 1, wherein the control circuit, if the recording failure detector detects a failure of information recording condition, obtains the optimal recording power for trial write operation corresponding to the target β value through the OPC processing and directs the optical disc apparatus to perform the trial write operation by use of the optimal recording power.

3. The optical disc apparatus according to claim 1, wherein the β measurement unit measures the β value of the recording mark written as a trial; and the recording power correction and calculation unit compares the measured β value with the target β value, obtains the correction factor or correction amount of recording power according to the difference between the two β values, and calculates optimal recording power based on the obtained correction factor or correction amount.

4. The optical disc apparatus according to claim 2, wherein the β measurement unit measures the β value of the recording mark written as a trial; the recording power correction and calculation unit compares the measured β value with the target β value, obtains the correction factor or correction amount of recording power according to the difference between the two β values, and calculates optimal recording power based on the obtained correction factor or correction amount.

5. The optical disc apparatus according to claim 1, wherein as a failure of the information recording condition, the recording failure detector detects at least one of the facts that the quantity of light or intensity of returned light of laser currently being recorded has reached a permissible limit, that the amount of tracking fluctuation or focus fluctuation has reached a permissible limit, that the fluctuation of the β value in walking OPC has exceeded a permissible limit and correction of recording power has become impossible, that the variation of recording current has reached a permissible limit, and that transmission of information data from an external host computer (not shown) has stopped or the amount of transmission of the information data has decreased, and accordingly the amount of information data on the optical disc apparatus has become a permissible limit or less.

6. The optical disc apparatus according to claim 1, wherein as the recording region in which the OPC processing and the trial write operation are performed, the control circuit selects a recording region in which the recording-speed value under the low-speed rotating condition is equal to or slightly smaller than that in trial write operation on the inner or outer circumference of the disc performed before the start of recording.

7. A information recording method for recording information with an optical disc apparatus by irradiating an optical disc with laser beams, the information recording method comprising:
    a first step for detecting a recording condition failure at the time of recording;
    a second step for stopping recording operation to the optical disc;
    a third step for changing the number of rotations of the optical disc to a low-speed value;
    a fourth step for selecting a recording region in which OPC processing and trial write operation are performed with the selected number of rotations for low-speed operation;

a fifth step for performing OPC processing in the selected recording region to obtain optimal recording power for trial write operation;

a sixth step for performing trial write operation in the recording region with the obtained optimal recording power;

a seventh step for measuring the β value of the recording mark written as a trial;

an eighth step for comparing the measured β value with the target β value and calculating a correction amount or correction factor of recording power according to the difference between the two β values;

a ninth step for correcting the optimal recording power for trial write operation, which has been obtained in the fifth step, by means of the calculated correction factor or correction amount of recording power, and calculating the optimal recording power for recording;

a tenth step for setting the obtained optimal recording power; and an eleventh step for starting the operation of information recording with the number of rotations for low-speed operation at a recording position by use of the optimal recording power.

8. The information recording method according to claim 7, wherein
in the first step, as a failure of the information recording condition, at least one of the facts that the quantity of light or intensity of returned light of laser currently being recorded has reached a permissible limit, that the amount of tracking fluctuation or focus fluctuation has reached a permissible limit, that the fluctuation of the β value in walking OPC has exceeded a permissible limit and correction of recording power has become impossible, that the variation of recording current has reached a permissible limit, and that transmission of information data from an external host computer (not shown) has stopped or the amount of transmission of the information data has decreased, and accordingly the amount of information data on the optical disc apparatus has become a permissible limit or less, is detected.

9. The information recording method according to claim 7, wherein
in the fourth step, as the recording region in which the OPC processing and the trial write operation are performed, a recording region in which the recording-speed value under the low-speed rotating condition is equal to or slightly smaller than that in trial write operation on the inner or outer circumference of the disc performed before the start of recording is selected.

* * * * *